United States Patent [19]
Perry

[11] 3,891,167
[45] June 24, 1975

[54] VEHICLE PRESENCE DETECTION IN A VEHICLE CONTROL SYSTEM

[75] Inventor: Robert H. Perry, Cannonsburg, Pa.

[73] Assignee: Westinghouse Electric Corporation, Pittsburgh, Pa.

[22] Filed: May 31, 1974

[21] Appl. No.: 475,231

[52] U.S. Cl. .......................... 246/34 R; 246/122 R
[51] Int. Cl. ............................................ B61l 25/02
[58] Field of Search .......... 246/34 R, 34 CT, 122 R, 246/167 D; 179/82

[56] References Cited
UNITED STATES PATENTS

| | | | |
|---|---|---|---|
| 2,895,042 | 7/1959 | Hailes | 246/122 R |
| 3,821,544 | 6/1974 | Matty | 246/34 CT |
| R27,472 | 9/1972 | Thorne-Booth | 246/34 CT |

Primary Examiner—Trygve M. Blix
Assistant Examiner—Barry L. Kelmachter
Attorney, Agent, or Firm—R. G. Brodahl

[57] ABSTRACT

Vehicle presence in one of a plurality of track circuit blocks is ascertained in response to the vehicle shunting the vehicle control signal flowing in the rails, such that way-side circuitry senses the vehicle control signal at a reduced signal level, resulting in a lack of comparison between the transmitted and received vehicle control signal which is indicative of vehicle presence. In the event the vehicle control signal is not shunted, backup vehicle presence detection is implemented by the vehicle transmitting a vehicle presence signal which is received by the way-side circuitry in the one track circuit block when the vehicle is present therein. The way-side circuitry responds to the received vehicle presence signal for modifying the information content of the sensed vehicle control signal, which results in a lack of comparison between the transmitted and received vehicle control signal, thereby indicating vehicle presence in the one track circuit block.

11 Claims, 4 Drawing Figures

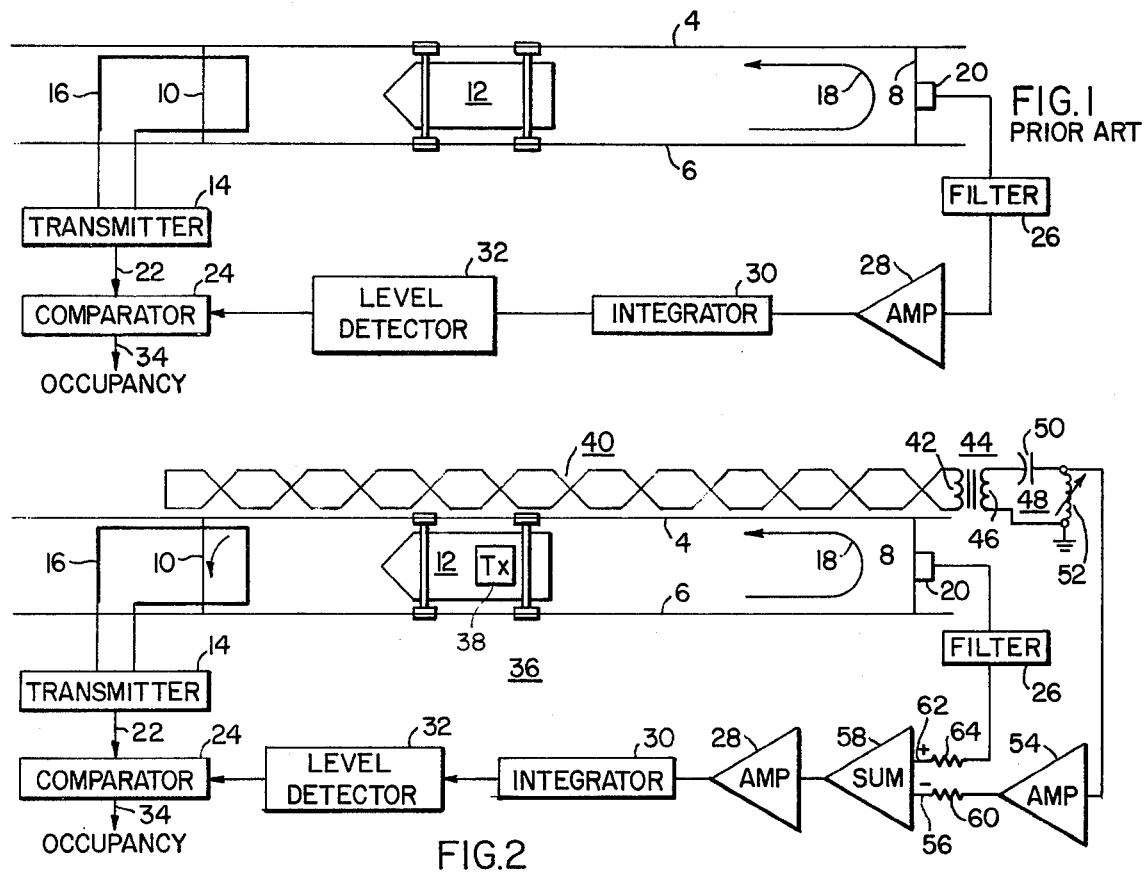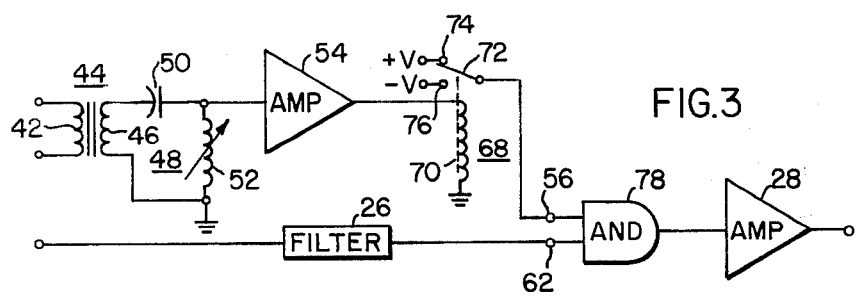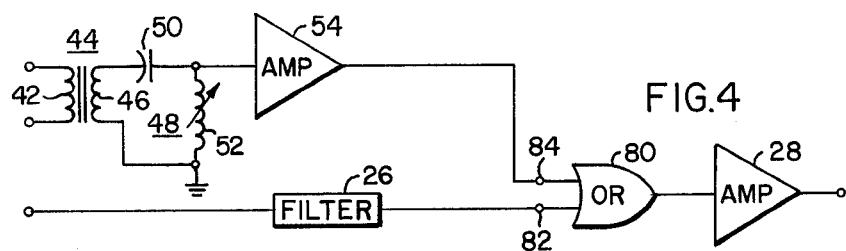

VEHICLE PRESENCE DETECTION IN A VEHICLE CONTROL SYSTEM

CROSS REFERENCE TO RELATED APPLICATIONS

Reference is made to the following U.S. patents: "Signal System for Determining the Presence of A Train Vehicle", U.S. Pat. No. Re. 27,472 which is a reissue of U.S. Pat. No. 3,526,378 filed Aug. 23, 1967, on behalf of G. M. Thorne-Booth; and U.S. Pat. No. 3,593,022 filed Sept. 25, 1968, on behalf of R. C. Hoyler and G. M. Thorne-Booth. Each of the referenced U.S. Patents is assigned to the assignee of the present invention.

BACKGROUND OF THE INVENTION

With the advent of welded continuous steel rails, it is sometimes difficult to ascertain vehicle presence in a track circuit block. The reason for the difficulty may be due to rust or like residue forming on the rails, which results in a high impedance between the rails and the vehicle shunt. Accordingly, the vehicle control signal flowing in the rails is not shunted by the vehicle and is received at essentially a normal signal level which incorrectly indicates the absence of a vehicle in the track circuit block. This is a non-safe condition, since a following vehicle may enter the track circuit block and collide with the vehicle presently therein, resulting in damage to the vehicle, and perhaps loss of life or injury to persons on board.

According to the present invention, in addition to circuitry for detecting the vehicle shunting of the vehicle control signal flowing in the rails to indicate vehicle presence or block occupancy, circuitry is included for receiving a vehicle presence signal transmitted by the vehicle present in the tract circuit block. In response to the vehicle presence signal being detected, the information content of the sensed vehicle control signal is modified, resulting in an indication of vehicle presence in the track circuit block.

SUMMARY OF THE INVENTION

A vehicle control system is disclosed for determining the presence of a vehicle along a conductive track divided into a plurality of track circuit blocks. There are means for introducing a vehicle control signal into a given one of the track circuit blocks. Also included are means for sensing the presence of the introduced vehicle control signal in the given one of the track circuit blocks, with the sensed vehicle control signal being at a given signal level during the absence of the vehicle, and normally being at a reduced signal level during the presence of the vehicle. Further included are means for transmitting a vehicle presence signal from the vehicle, and included are means for altering the information content of the sensed vehicle control signal in response to sensing the transmission of the vehicle presence signal.

BRIEF DESCRIPTION OF THE DRAWINGS

FIG. 1 is a schematic and block diagram representation of a vehicle presence detection system known in the prior art;

FIG. 2 is a schematic and block diagram representation of a vehicle presence detection system according to the present invention;

FIG. 3 is a schematic and block diagram representation of a modification of the embodiment of the vehicle presence detection system according to FIG. 2; and FIG. 4 is yet another modification of the embodiment of the vehicle presence detection system according to FIG. 2.

DESCRIPTION OF THE PREFERRED EMBODIMENT

FIG. 1 illustrates a known vehicle presence detection system 2 which includes a conductive track comprising welded continuous rails 4 and 6 with shunts, such as shorting bars 8 and 10 being connected between the rails for equalizing the propulsion currents flowing therein, as well as for defining a track circuit block. The sections of track between and including the shorting bars 8 and 10 defines a track circuit block, with like track circuit blocks being defined in the sections of track to the right and to the left of the shorting bars 8 and 10 respectively. A vehicle 12 is operational in the vehicle control system, with the idea being to detect the presence or absence of the vehicle 12 within the track circuit block. A wayside transmitter 14 transmits an information bearing vehicle control signal such as a speed command to the track circuit block via a loop antenna 16 which induces the current flow in the rails 4 and 6 in a direction as illustrated by the arrow 18. A signal receiving means such as a coil 20 is mounted on the shorting bar 8, and has signal flow induced therein in response to the vehicle control signal flowing through the shorting bar 8. When the vehicle 12 is not present within the track circuit block, the current flow through the track circuit block is at a given signal level which is indicative of the vehicle being absent from the track circuit block. On the other hand, when the vehicle 12 is within the track circuit block the wheels and axles of the vehicle normally shunt the current flowing through the rails, resulting in a reduced current flow through the shorting bar 8 which is indicative of vehicle presence.

As was previously stated, the vehicle control signal transmitted by the transmitter 14 includes information content, and for example, may be a vehicle speed command which is binary coded with the binary one indications being at one frequency, and the binary zero indications being at a second frequency. The referenced U.S. Pat. No. 3,593,022 discloses a system for providing a vehicle control signal which may be used in the circuitry of FIG. 1, with a more detailed description of the track circuitry and the track circuit block being disclosed in the reference U.S. Pat. No. Re. 27,472. For the system illustrated, vehicle presence is ascertained by comparing on a bit-by-bit comparison basis the transmitted vehicle control signal, with the received vehicle control signal. If the bit-by-bit comparison is identical the track circuit block is considered to be absent a vehicle, whereas if there is a lack of comparison the track circuit block is considered to have a vehicle present therein.

The transmitter 14 transmits the transmitted control signal to a comparator 24 via a line 22. The vehicle control signal which is sensed by the coil 20 if provided to a filter 26, for only passing signals in the frequency band of interest, which signal is then amplified by an amplifier 28 which provides an input signal to an integrator 30. The output from the integrator 30 is provided to the input of a level detector 32 which provides an output only when the level of the input signal is at a predetermined signal level. This is done to insure that noise signals are not interpreted as valid control signals which may incorrectly indicate the absence of a vehicle within the track circuit block. The output signal from the level detector 32, is then provided to a second input of the comparator 24 for the comparison on a bit-by-bit basis with the signal provided from the transmitter 14. If the signals compare a signal output is provided on a line 34 indicating that the track circuit block is absent a vehicle, whereas if there is a lack of comparison a signal indication is provided on line 34 which is indicative of a vehicle being present within the track circuit block. For example, if there is a comparison of signals, a voltage may be provided on line 34, and if there is a lack of comparison, zero volts is provided on line 34. This signal is normally transmitted to a speed encoder in the preceding track circuit block which the vehicle 12 has just left, such that a proper speed code may be generated for the preceding track circuit block such that another vehicle is not permitted to enter the track circuit block which the vehicle is presently in.

For the vehicle presence detection system illustrated in FIG. 1, a possibility exists that there may be residue on the tracks, or on the wheels of the vehicle or both such that the vehicle 12 does not shunt the vehicle control signal flowing through the rails. Accordingly, the signal sensed by the coil 20 is of a level sufficient to enable the level detector 32 to provide a proper signal output to the comparator 24 such that the comparator 24, through the previously explained comparison process, indicates the absence of a vehicle within the track circuit block when in fact there is a vehicle present. This is clearly a non-safe condition, since this indication is transmitted to the preceding track circuit block which provides a vehicle speed command which incorrectly permits a vehicle to enter the track circuit block shown.

Refer now to FIG. 2 which illustrates a vehicle presence detection system 36 according to the present invention. Circuit elements which are the same as those illustrated in FIG. 1 are given like numeral designations. It is seen that the vehicle 12 includes a transmitter 38 which transmits what is termed a vehicle presence signal. The vehicle presence signal may be a fixed frequency signal, a variable frequency signal, a randomly coded binary signal, or the like. In practice, the illustrated transmitter 38 may comprise two transmitters with one being situated at the front of the vehicle 12 and the other being situated at the back of the vehicle 12, and including an antenna arrangement which couples with an antenna 40 which is situated along the length of and adjacent to the illustrated track circuit block. The antenna 40 is connected to the primary winding 42 of a transformer 44 which has its secondary winding 46 connected to a filter network 48 comprising a capacitor 50 and a variable coil 52. The output of the filter 48 is connected to the input of an amplifier 54 which is coupled to a first input 56 of a summing amplifier 58 by way of a resistor 60. The output of the filter 26 is coupled to an input 62 of the summing amplifier 58 by way of a resistor 64. It is seen that the remainder of the circuit is as illustrated in FIG. 1. The function of the summing amplifier 58 is to sum the vehicle control signal flowing in the track circuit block, which is sensed by the coil 20, with the vehicle presence signal which is sensed by the antenna 40. It is seen that as a result of the normal summing action of the amplifier 58 the sensed vehicle control signal is altered or modified by the vehicle presence signal. That is, the binary information content of the vehicle control signal is changed. Accordingly, the modified vehicle control signal appearing at the output of amplifier 58 does not compare with the vehicle control signal as transmitted, and the track circuit block is considered as having a vehicle present therein.

Assume that the vehicle 12 is within the track circuit block as illustrated, and that there is residue on the rails and the wheels of the vehicle such that the vehicle control signal flowing through the rails is not shunted by the vehicle and is therefore flowing at a normal or at least a substantially normal signal level through the shorting bar 8, which signal is sensed by the coil 20 and is provided by the filter 26 to the input 62 of the summing amplifier 58. In the prior art circuit as illustrated in FIG. 1, this signal would be provided to the comparator 24 without modification and in response thereto the comparator 24 would indicate a comparison of the transmitted signal with the received signal and the track circuit block would be considered absent a vehicle. This does not happen in the system illustrated in FIG. 2, since the antenna 40 receives the transmitted vehicle presence signal which is coupled to the input 56 of the amplifier 58 via the filter network 48 and the amplifier 54. Assuming that the vehicle presence signal is a fixed frequency signal, for each bit of the received vehicle control signal, this signal is modified and the detected signal appearing at the output of the amplifier 58 is different from, that is would be modified with respect to the signal appearing at the input 62. Accordingly, the signal output from the level detector 32 is different from the signal input provided on line 22 to the comparator 24 and there is lack of comparison, and the track circuit block is considered to have a vehicle present therein. A lack of comparison also results if the vehicle 12 properly shunts the signal flowing through the rails since the summing amplifier 58 provides a signal output which is now substantially identical to the vehicle presence signal sensed by the antenna 40, which signal is assumed to be different from the vehicle control signal, and accordingly a lack of comparison results.

Other circuitry may be used for modifying the information content of the vehicle control signal. That is, the summing amplifier 58 may be replaced by other circuit elements which perform a like function. For example, a relay 68 may be connected, as illustrated in FIG. 3, to the output of the amplifier 54, with a relay contact 72 being connected to a terminal 74 for providing a + V enable signal to the terminal 56 of AND gate 78 whenever the relay 68 is deenergized, which is indicative of the antenna 40 not sensing a vehicle presence signal. When the relay 68 is energized in response to a vehicle presence signal being sensed the contact 72 is brought in contact with terminal 76 and a −V disable signal is provided to the terminal 56 for disabling the AND gate 78. It is seen, therefore, that whenever a vehicle is present within the track circuit block and a vehicle presence signal is received by the antenna 40 energizing the relay 68, the AND circuit 78 is disabled from providing a signal output irrespective of any vehicle control signal input applied to the terminal 62 thereof. Accordingly, with there being no signal output from the AND gate 78, which in turn is connected to the amplifier 28, there would be no signal input to the comparator 24 from the level detector 32, resulting in lack of comparison thereby indicating vehicle presence, that is block occupancy. It is also seen that whenever the vehicle presence signal is not received the AND gate 78 is enabled and the contol signal is passed to the comparator resulting in a comparison of signals which indicates absence of a vehicle.

Yet another circuit which may be used for modifying the information content of the received vehicle control signal is illustrated in FIG. 4. An OR gate 80 is used in place of the summing amplifier 58 with the received vehicle control signal being applied to an input terminal 82 thereof, and with the received vehicle presence signal being applied to an input terminal 84 thereof. It is seen that any time the vehicle presence signal is provided to the input terminal 84 the output signal from the OR gate 80 is modified with respect to any signal appearing at the input terminal 82 due to the normal functioning of the OR gate 80. Therefore, the information content of any vehicle control signal appearing at the terminal 82 is modified whenever a vehicle presence signal is provided to the input terminal 84. It is seen that in the absence of a vehicle in the track circuit block the received vehicle control signal provided to the terminal 82 is passed by the OR gate 80 and the comparison process results in a bit-by-bit comparison which is indicative of vehicle absence in the track circuit block.

In summary, a vehicle control system for determining the presence of a vehicle along a conductive track divided into a plurality of track circuit blocks has been disclosed. Included are means for introducing a vehicle control signal into a given one of the track circuit blocks, further including means for sensing the presence of the introduced vehicle control signal in the given one of the track circuit blocks, with the sensed vehicle control signal being at a given signal level during the absence of the vehicle and normally being at a reduced signal level during the presence of the vehicle. There are also means for transmitting a vehicle presence signal from the vehicle, including means for modifying the information content of the sensed vehicle control signal in reponse to sensing the transmission of the vehicle presence signal. Vehicle presence is indicated in response to the sensed vehicle control signal being modified.

I claim:

1. In a vehicle control system for determining the presence of a vehicle along a conductive track divided into a plurality of track circuit blocks, the combination comprising:
   means for introducing a vehicle control signal into a given one of said track circuit blocks;
   means for sensing the presence of the introduced vehicle control signal in said given one of said track circuit blocks, with the sensed vehicle control signal being at a given signal level during the absence of said vehicle and normally being at a reduced signal level during the presence of said vehicle;
   means for transmitting a vehicle presence signal from said vehicle; and
   means for altering the information content of the sensed vehicle control signal in response to sensing the transmission of said vehicle presence signal.

2. The combination claimed in claim 1, including:
   means for indicating presence of said vehicle within said given one of said track circuit blocks in response to the information content of the sensed vehicle control signal being altered.

3. In a vehicle control system for determining the presence of a vehicle along a conductive track divided into a plurality of track circuit blocks, the combination comprising:
   means for introducing a vehicle control signal into a given one of said track circuit blocks;
   means for sensing the presence of the introduced vehicle control signal in said given one of said track circuit blocks, with the sensed vehicle control signal being at a given signal level during the absence of said vehicle and normally being at a reduced signal level during the presence of said vehicle;
   means for transmitting a vehicle presence signal from said vehicle;
   means for sensing the transmission of said vehicle presence signal during the time said vehicle is present within said given one of said track circuit blocks; and
   means for modifying the sensed vehicle control signal in response to sensing the transmission of said vehicle presence signal.

4. The combination claimed in claim 3, including:
   means for indicating presence of said vehicle within said given one of said track circuit blocks in response to the modification of the sensed vehicle control signal.

5. In a vehicle control system for determining the presence of a vehicle along a conductive track divided into a plurality of track circuit blocks, the combination comprising:
   means for introducing a vehicle control signal into a given one of said track circuit blocks;
   means for sensing the presence of the introduced vehicle control signal in said given one of said track circuit blocks, with the sensed vehicle control signal being at a given signal level during the absence of said vehicle and normally being at a reduced signal level during the presence of said vehicle;
   means for transmitting a vehicle presence signal from said vehicle;
   means for sensing the transmission of said vehicle presence signal during the time said vehicle is present within said given one of said track circuit blocks; and
   means for indicating presence of said vehicle within said given one of said track circuit blocks in response to sensing one of said vehicle control signal at a reduced signal level and said vehicle presence signal.

6. In a vehicle control system for determining the presence of a vehicle along a conductive track divided into a plurality of track circuit blocks, the combination comprising:
   means for introducing a vehicle control signal into a given one of said track circuit blocks;
   means for sensing the presence of the introduced vehicle control signal in said given one of said track circuit blocks, with the sensed vehicle control signal being at a given signal level during the absence of said vehicle and normally being at a reduced signal level during the presence of said vehicle;
   means for transmitting a vehicle presence signal from said vehicle;
   means for sensing the transmission of said vehicle presence signal during the time said vehicle is present within said given one of said track circuit blocks;

means for modifying the sensed vehicle control signal in response to the transmitted vehicle presence signal being sensed; and means for comparing the modified sensed vehicle control signal with the introduced vehicle control signal for determining the presence of said vehicle in said given one of said track circuit blocks.

7. The combination claimed in claim 6 wherein said means for modifying comprises a summing amplifier having a first input to which the sensed vehicle control signal is applied, and a second input to which the sensed vehicle control signal is applied and having an output at which the modified sensed vehicle control signal is provided.

8. The combination claimed in claim 6 wherein said means for modifying comprises a gate having a first input to which the sensed vehicle control signal is applied and a second input to which a signal indicative of the sensed vehicle presence signal is applied and having an output at which the modified sensed vehicle control signal is provided.

9. In a vehicle control system for determining the presence of a vehicle along a conductive track divided into a plurality of track circuit blocks, the combination comprising:

means for introducing a vehicle control signal into a given one of said track circuit blocks;

means for sensing the presence of the introduced vehicle control signal in said given one of said track circuit blocks with the sensed vehicle control signal being at a given signal level during the absence of said vehicle and normally being at a reduced signal level during the presence of said vehicle;

means for transmitting a vehicle presence signal from said vehicle;

antenna means extending substantially the length of said given one of said track circuit blocks and being placed adjacent thereto for being excited by the transmitted vehicle presence signal;

first and second filters, with the first filter providing a signal output in response to the introduced vehicle control signal being sensed, and with the second filter providing a signal output in response to said antenna means being excited by said vehicle presence signal;

means for providing a detected signal in response to the provision of an output signal from one of said first and second filters; and comparator means for comparing the introduced vehicle control signal with said detected signal for indicating vehicle presence in said given one of said track circuit blocks whenever there is lack of comparison of the compared signals.

10. The combination claimed in claim 9 wherein said means for providing a detected signal comprises a summing amplifier having a first input to which the output signal from said first filter is applied, and a second input to which the output signal from said second filter is applied, and having an output at which said detected signal is provided.

11. The combination claimed in claim 9 wherein said means for providing a detected signal comprises a gate having a first input to which the output signal from said first filter is applied, and a second input to which a signal, indicative of an output from said second filter is applied, and having an output at which said detected signal is provided.

* * * * *